United States Patent Office 3,269,909
Patented August 30, 1966

3,269,909
ANALGESIC METHODS AND COMPOSITIONS OF BENZOIC ACID DERIVATIVES
Frederick Leonard, Yonkers, N.Y., assignor to Geigy Chemical Corporation, Greenburgh, N.Y., a corporation of Delaware
No Drawing. Filed Aug. 21, 1963, Ser. No. 303,682
8 Claims. (Cl. 167—65)

This application is a continuation-in-part of said co-pending application, Serial No. 57,144, filed September 20, 1960, now U.S. Patent No. 3,105,090, which in turn is a continuation-in-part of my copending application, Serial No. 53,906, filed September 6, 1960, now abandoned.

This invention relates to novel methods and compositions for effecting analgesia in animal organism. In particular the present invention pertains to a method of effecting analgesia by administering a benzoic acid derivative as hereinafter defined or an addition salt thereof, the addition salt being derived from a pharmaceutically acceptable non-toxic base.

In general the structure of the benzoic acid derivatives which are employed in this invention may be represented as follows:

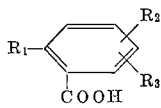

in which:
  $R_1$ is (lower) alkoxy, phenoxy or halogeno,
  $R_2$ is (lower) alkyl or hydrogen, and
  $R_3$ is (lower) alkoxymethyl, carbomethoxymethyl, (lower) alkenoxymethyl, (lower) alkynoxymethyl, cycloalkoxymethyl, halo (lower) alkoxymethyl, hydroxy (lower) alkyl, hydroxy (lower) alkoxymethyl, phenyl (lower) alkoxymethyl, (lower) alkylmercaptomethyl or (lower) alkylsulfonylmethyl.

A class of benzoic acid derivatives particularly valuable for use in this invention are those compounds of the formula:

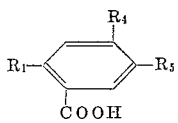

wherein:
  $R_1$ is as above defined,
  one of $R_4$ and $R_5$ is hydrogen or (lower) alkyl and the other of $R_4$ and $R_5$ is of the structure:

$$-CH_2O-(C_nH_{2n})-H$$

in which $n$ has the value of from zero to six inclusively.

Still another class of benzoic acid derivatives particularly valuable for use in my invention are those compounds of the formula

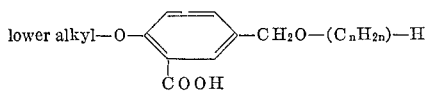

as well as the salts thereof, wherein $n$ has the value of from zero to six inclusively. This class includes compounds of the formulae

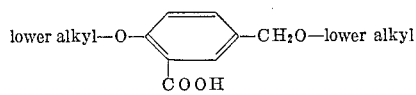

and

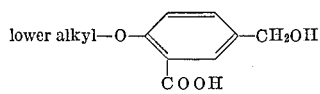

By the term "(lower) alkyl" and derivations thereof, e.g., "(lower) alkoxy," "(lower) alkenoxy," etc., are intended a group comprising a straight or branched hydrocarbon chain containing from one to about six carbon atoms. By the term "cycloalkyl" and derivations thereof, e.g. "cycloalkoxy," are intended a cyclic hydrocarbon containing six to seven carbon atoms.

Also included within the scope of the present invention are the addition salts of the above acids as derived from pharmaceutically acceptable non-toxic bases. Such salts include for example metal salts such as sodium, potassium, calcium, aluminum and the like as well as organic amine salts such as triethylamine, procaine, N-ethylpiperidine, hydrabamine, amphetamine and the like.

According to this invention, the above compounds are administered to animal organisms for the purpose of treating various pain manifestations as for example those associated with the common cold, bursitis, general headache, minor injuries such as sprains and bruises, dysmenorrhea, toothache and the like. While they may be administered via any of the usual routes, e.g. parenterally, rectally or the like, the preferred route is orally. For such oral administration, the incorporation of a pharmaceutical carrier for the formation of a pharmaceutical composition is highly desirable.

Such suitable compositions include without limitation, tablets, capsules, powders, solutions, suspensions, sustained release formulations and the like.

By the administration of these compounds in dosages of from about 30 mg./kg. to about 100 mg./kg. of body weight, preferably 40 to 90 mg./kg., pain thresholds can be effectively raised by from 30 to 100% with few, if any, untoward side effects. When necessary, the dosage may be repeated in three to four hour intervals. Thus, for example, a highly effective dose for an adult human of average size is about 300 mg.

Depending on the nature of the specific condition, this invention may be practiced in conjunction with the administration of other medicinal agents. Thus, for example, the compounds described herein may be combined with aspirin, caffein, barbiturates, phenacetin, amphetamines or the like as well as combinations thereof and advantageously administered in such combination.

Representative of the compounds which may be employed in this invention are:

2-methoxy-5-ethoxymethylbenzoic acid
2-methoxy-5-isopropoxymethylbenzoic acid
2-methoxy-5-n-butoxymethylbenzoic acid
3-carboxy-4-methoxybenzyloxyacetic acid
2-methoxy-5-allyloxymethylbenzoic acid
2-methoxy-5-propargyloxymethylbenzoic acid
2-methoxy-5-cyclopentyloxymethylbenzoic acid
2-methoxy-5-(β-chloroethoxymethyl) benzoic acid
2-methoxy-5-(2,3-dihydroxypropoxymethyl) benzoic acid
2-methoxy-5-benzyloxymethylbenzoic acid
2-ethoxy-5-ethoxymethylbenzoic acid
2-phenoxy-5-ethoxymethylbenzoic acid
2-methoxy-5-hydroxymethylbenzoic acid
2-ethoxy-5-hydroxymethylbenzoic acid
2-chloro-5-hydroxymethylbenzoic acid
2-chloro-5-(n-butoxymethyl) benzoic acid
2-methoxy-5-hexyloxymethylbenzoic acid
2-methoxy-5-ethylmercaptomethylbenzoic acid
2-methoxy-5-ethylsulfonylmethylbenzoic acid
2-methoxy-3-methyl-5-ethoxymethylbenzoic acid, and
2-methoxy-4-ethoxymethylbenzoic acid.

Obviously intended to be embraced by the above are the addition salts thereof with phermaceutically acceptable nontoxic bases.

The above compounds employed in the present invention may be prepared according to the methods described in my co-pending application, Ser. No. 57,144, now U.S. Patent No. 3,105,090, of which the following Examples 1–4 are representative. All of the following Examples 1–9 are given solely for the purpose of further illustrating the present invention and should not be construed as a limitation thereof.

EXAMPLE 1.—2-METHOXY-5-ETHOXYBENZOIC ACID

A solution of sodium ethylate is prepared from 1.3 parts of sodium and 100 parts by volume of ethanol. To this solution are added 10 parts of 2-methoxy-5-chloromethylbenzoic acid dissolved in 50 parts by volume of ethanol. The mixture is stirred and refluxed for 4 hours and concentrated in vacuo. The residue is suspended in 100 parts by volume of water and acidified to Congo red with concentrated hydrochloric acid. The oil which separates is extracted twice with 100 parts each of ethyl acetate. The extracts are dried over anhydrous sodium sulfate. The sodium sulfate is filtered off and the filtrate is concentrated in vacuo. The yellow residue which remains crystallizes on chilling.

2-methoxy-5-ethoxymethylbenzoic acid is obtained as a white crystalline compound after recrystallization by dissolution in a minimum volume of hot ethyl acetate and addition of petroleum ether until the first appearance of turbidity. It melts at 53–54°, the yield being 3.5 parts. Additional recrystallization raises the melting point to 59°.

EXAMPLE 2.—SODIUM 2-METHOXY-5-METHOXYMETHYLBENZOATE 10 parts of methyl 2-methoxy-5-methoxymethylbenzoate are refluxed in 100 parts by volume of 10% sodium hydroxide for a period of 12 hours. The reaction mixture is cooled and the pH is adjusted to Congo red with hydrochloric acid. The reaction mixture is extracted with ether, dried over anhydrous sodium sulfate and concentrated. The remaining oil is dissolved in ethanol and a stoichiometric amount of sodium in ethanol is added to the ethanol solution. Upon concentration of the mixture, sodium 2-methoxy-5-methoxymethylbenzoate is obtained as a crystalline compound, which melts at 277–278° after recrystallization from 95% ethanol. The yield is 6 parts.

EXAMPLE 3.—POTASSIUM 2-METHOXY-5-ETHOXYMETHYLBENZOATE 84.4 parts of 2-methoxy-5-ethoxymethylbenzoic acid, prepared according to Example 1, are dissolved in 200 parts by volume of ethanol. To this solution is added the calculated amount of potassium hydroxide dissolved in 200 parts by volume of 95% ethanol. The reaction mixture is then concentrated in vacuo, whereupon a white crystalline solid comprising potassium 2-methoxy-5-ethoxymethylbenzoate is obtained. After recrystallization from isopropyl alcohol, it melts at 191–192°. The yield is 75 parts (82.5%).

EXAMPLE 4.—2-METHOXY-5-HYDROXYMETHYLBENZOIC ACID 10 parts of 2-methoxy-5-chloromethylbenzoic acid are refluxed with 100 parts by volume of 10% sodium hydroxide for 3 hours. The resulting mixture is cooled and acidified to Congo red with concentrtaed hydrochloric acid. The oil which separates is extracted with ethyl acetate. The extract is dried over anhydrous sodium sulfate, the sodium sulfate is filtered off, and the ethyl acetate solution is concentrated to a small volume. The residual oil crystallizes in several hours at ice-bath temperature and is then collected and recrystallized from benzene. The white crystalline product of 2-methoxy-5-hydroxymethylbenzoic acid melts at 90–91°. The yield is 4 parts (48%).

EXAMPLE 5

| Ingredient: | Quality/capsule, mg. |
|---|---|
| 2-methoxy-5-isopropoxymethylbenzoic acid | 150 |
| Corn starch U.S.P. | 150 |

The above ingredients are mixed and introduced into a two-piece hard gelatin No. 1 capsule. One or two such capsules are administered every three hours.

EXAMPLE 6

Three hundred milligrams of 2-methoxy-5-hydroxymethylbenzoic acid are introduced into a No. 1 capsule and one such capsule is administered every four hours.

EXAMPLE 7

| Ingredient: | Quality/tablet, mg. |
|---|---|
| 2-methoxy-5-hydroxymethylbenzoic acid | 300 |
| Corn starch U.S.P. | 50 |
| Lactose U.S.P. | 40 |
| Cab-O-Sil M–5 | 4 |
| Gelatin U.S.P. | 5 |
| Magnesium stearate U.S.P. | 1 |

The above ingredients, after being thoroughly mixed, are pressed into single scored tablets, one tablet being administered every three to four hours.

EXAMPLE 8

| Ingredient: | Quality/capsule, mg. |
|---|---|
| 2-methoxy-5-ethoxymethylbenzoic acid | 150 |
| Corn starch U.S.P. | 150 |

The above ingredients are used to fill a No. 1 hard shell gelatin capsule, one or two such capsules being administered every three to four hours.

EXAMPLE 9

| Ingredient: | Quality/tablet, mg. |
|---|---|
| 2-methoxy-5-ethoxymethylbenzoic acid | 300 |
| Corn starch U.S.P. | 50 |
| Lactose U.S.P. | 40 |
| Cab-O-Sil M–5 | 4 |
| Gelatin U.S.P. | 5 |
| Magnesium stearate U.S.P. | 1 |

The above ingredients are mixed intimately and pressed into single scored tablets of approximately 400 mg. and administered once every three hours.

What I claim is:

1. The method of effecting analgesia which comprises orally administering to a patient suffering with pain a therapeutic dose of a compound selected from the group consisting of
   (a) an acid of the formula:

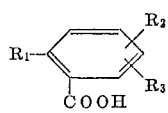

wherein:

$R_1$ is a member selected from the group consisting of (lower)alkoxy, phenoxy and halogeno, $R_2$ is a member selected from the group consisting of (lower)alkyl and hydrogen, $R_3$ is a member selected from the group consisting of (lower)alkoxymethyl, carbomethomethyl, (lower)alkenoxymethyl, (lower)alkynoxymethyl, cycloalkoxymethyl, halo(lower)alkoxymethyl, hydroxy(lower)alkyl, hydroxy(lower)alkoxymethyl, phenyl (lower)alkoxymethyl, (lower)alkylmercaptomethyl and (lower)alkylsulfonylmethyl; and (b) the addition salts thereof with pharmaceutically acceptable non-toxic bases.

2. The method of effecting analgesia which comprises orally administering to a patient suffering with pain a therapeutic dose of a compound selected from the group consisting of
(a) an acid of the formula:

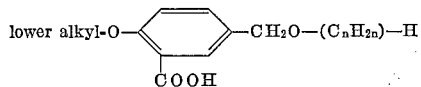

wherein *n* has the value of from 0 to 6 inclusively and
(b) the addition salts thereof with pharmaceutically acceptable non-toxic bases.

3. The method of claim 2 wherein the acid is 2-methoxy-5-hydroxymethylbenzoic acid.

4. The method of effecting analgesia which comprises orally administering to a patient suffering with pain a therapeutic dose of a compound selected from the group consisting of an acid of the formula:

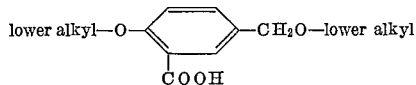

and the addition salts thereof with pharmaceutically acceptable non-toxic bases.

5. The method of claim 4 wherein the acid is 2-methoxy-5-ethoxymethylbenzoic acid.

6. Pharmaceutical composition for use in effecting analgesia comprising a pharmaceutical carrier and, in an amount sufficient to provide a dosage of from about 30 mg./kg. to about 100 mg./kg. of body weight, a member selected from the group consisting of
(a) an acid of the formula

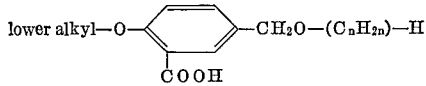

wherein *n* has the value from 0 to 6 inclusively and
(b) the addition salts thereof with pharmaceutically acceptable non-toxic bases, in oral unit dosage form.

7. A composition according to claim 6 wherein the acid is 2-methoxy-5-hydroxymethylbenzoic acid.

8. A composition according to claim 6 wherein the acid is 2-methoxy-5-ethoxymethylbenzoic acid.

References Cited by the Examiner
UNITED STATES PATENTS
3,105,090  9/1963  Leonard _____ 260—521

JULIAN S. LEVITT, *Primary Examiner.*

M. J. COHEN, *Assistant Examiner.*